Jan. 23, 1940.                P. RUFFO                2,187,915
                          BALL AND SOCKET JOINT
                           Filed Nov. 12, 1938
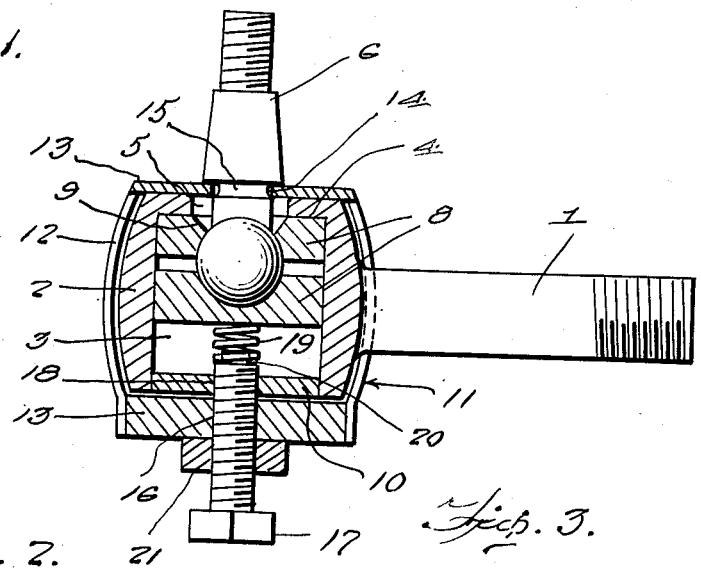
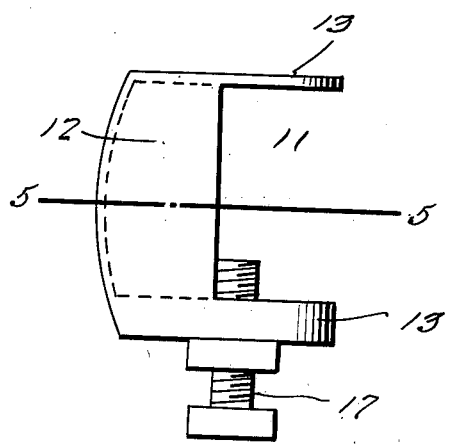
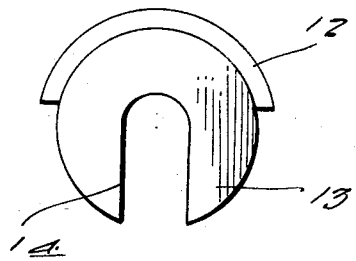
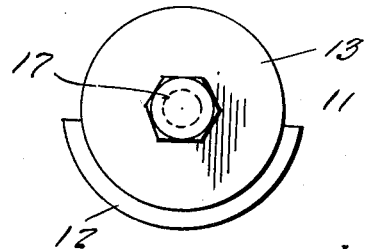
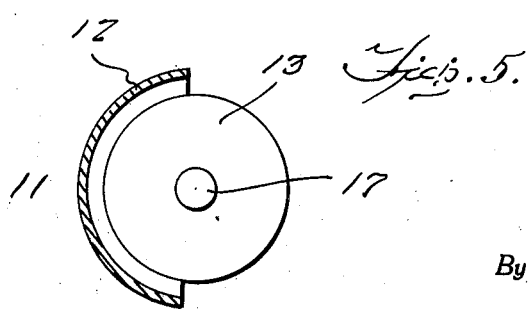
Inventor
Paul Ruffo
By Clarence A. O'Brien
and Hyman Berman
Attorneys Patented Jan. 23, 1940

2,187,915

UNITED STATES PATENT OFFICE 2,187,915

BALL AND SOCKET JOINT

Paul Ruffo, Miami, Fla., assignor, by mesne assignments, of one-half to André Jaques Mathieu, Miami, Fla.

Application November 12, 1938, Serial No. 240,135

2 Claims. (Cl. 287—90)

My invention relates to improvements in ball and socket joints such as are used in connecting the steering rod of automobile steering gear to the crank arm of the steering knuckle.

The principal object of the invention is to provide improved means for adjusting a joint of the character indicated to take up wear in the joint and thereby obviate rattling of the joint and lost motion resulting in shimmying.

To the accomplishment of the above, and subordinate objects presently appearing, the preferred embodiment of my invention is illustrated in the accompanying drawing, set forth in detail in the succeeding description and defined in the claims appended hereto.

In said drawing:

Figure 1 is a view in longitudinal section of a ball and socket joint embodying my improvement, Figure 2 is a view in side elevation of the yoke, Figure 3 is a view in end elevation of said yoke looking at the slotted end thereof, Figure 4 is a similar view looking at the other end of said yoke, and Figure 5 is a view in transverse section taken on the line 5—5 of Figure 2, looking in the direction indicated by the arrows.

Referring to the drawing by numerals, 1 designates the usual threaded spindle of the joint for attachment, in a manner well understood, to the steering rod, not shown, and 2 the socket part provided on one end of said spindle. The socket part 2 is provided with a straight bore 3 extending at a right angle to the axis of the spindle 1, an internal shoulder 4 at one end of the bore, and a restricted aperture 5 at said end of the bore for the extension therethrough of the shank 6 of the usual ball 7, said shank, as will be understood, being threaded at its free end for the attachment of the joint to the steering knuckle crank arm, not shown. The ball 7 is confined between a pair of opposed disk-like socket members 8, one apertured, as at 9, for the extension of the shank 6 therethrough, said members 8 and ball 7 being forced toward the shoulder 4 with one member in engagement with said shoulder by means presently described. The other end of the bore 3 is closed by the usual disk 10 secured therein by a press fit in spaced relation to the members 8 to provide for packing grease in the joint.

According to my invention the above described joint is equipped with a yoke 11 having a substantially semi-circular side walls 12 adapted to fit loosely part-way over the socket part 2, and circular ends 13 spaced apart to fit over the ends of said part 2. One end 13 of the yoke 11 is slotted radially, as at 14, to span and fit in a circumferential groove 15 provided in the shank 6. The other end 13 of said yoke 12 is provided with an axial threaded bore 16 therein for the extension therethrough of an adjusting bolt 17. The disk 10 is apertured axially, as at 18, for the passage of the bolt 17 into the bore 3. A coil spring 19 is interposed between the inner end of said bolt 17 and the adjacent socket member 8 whereby end thrust of the ball 7 and the appropriate member 8 is yieldingly sustained by said bolt. The inner end of the bolt 17 is reduced, as at 20, to project into the spring 19 and hold the same in place. A lock nut 21 is provided in said bolt 17 for holding the same in adjusted position. As will now be seen, the yoke 11 forms a coupling for attaching the bolt 17 to the described joint part and in which said bolt is adjustable to take up wear between the socket members 8 and the ball 7 and also between said members and the shoulder 4, said yoke forming a support attached to the shank 6 and rigidly opposing end thrust against the bolt 17.

The foregoing will, it is believed, suffice to impart a clear understanding of my invention without further explanation. Manifestly, modifications in the joint parts described in the foregoing may be resorted to without departing from the inventive concept, and right is herein reserved to such modifications as fall within the scope of the subjoined claims.

What I claim is—

1. In a joint of the class described, a socket part having ends and a straight bore therein, an internal shoulder adjacent one end thereof, and a restricted aperture in said end, a pair of opposed disk-like socket members slidable in said bore toward said shoulder, a ball confined between said socket members and having a shank extending through one of said members and out of said aperture and provided with a circumferential groove therein, a yoke adapted to span said part and having ends opposed to the ends of said part, one of said ends of the yoke being slotted to span the shank and fit into said groove thereof, a bolt threaded through the other end of said yoke and into the bore of said part, and a yielding connection between the inner end of said bolt and one of said socket members.

2. In a joint of the class described, a socket part having ends and a straight bore therein, an internal shoulder adjacent one end thereof, and a restricted aperture in said end, a pair of opposed disk-like socket members slidable in said bore toward said shoulder, a ball confined between said socket members and having a shank extending through one of said members and out of said aperture and provided with a circumferential groove therein, a yoke adapted to span said part and having ends opposed to the ends of said part, one of said ends of the yoke being slotted to span the shank and fit into said groove thereof, a bolt threaded through the other end of said yoke and into the bore of said part, and a yielding connection between the inner end of said bolt and one of said socket members, said connection comprising a coiled spring.

PAUL RUFFO.